United States Patent Office 3,790,688
Patented Feb. 5, 1974

3,790,688
WATER DISPERSIBLE BETA-CAROTENE
William M. Walter, Jr., and Albert E. Purcell, Raleigh, N.C., assignors to the United States of America as represented by the Secretary of Agriculture
No Drawing. Filed Mar. 15, 1972, Ser. No. 235,078
Int. Cl. A23l 1/26
U.S. Cl. 426—380
1 Claim

ABSTRACT OF THE DISCLOSURE

A process for preparing water dispersible β-carotene by slowly adding ether ethanol solutions of β-carotene to boiling solutions of soluble starch with rapid stirring and then precipitating the starch carotene colloid with methanol or ethanol and recovering the water dispersible precipitate.

---

A nonexclusive, irrevocable, royalty-free license in the invention herein described, throughout the world for all purposes of the United States Government, with the power to grant sublicenses for such purposes, is hereby granted to the Government of the United States of America.

This invention relates to a process for preparing a water dispersible carotene. More particularly, this invention relates to a process for preparing a water dispersible carotene which uses natural food products and does not change surface tension of solution at reasonable concentrations.

Carotenoids are not soluble in water. However, many food products would be improved nutritionally and have better appearance if carotene could be added to them. Bauernfeind et al., U.S. Pat. 2,861,891, used edible vegetable oils to prepare water dispersible carotenoid compositions. The instant invention relates to a novel process for the preparation of water dispersible β-carotene.

Since carotenoids are not soluble in water and most foods are highly aqueous, naturally occurring carotenoids are dispersed as colloids. Many food products, particularly juices and soft drinks, would be improved nutritionally and have better appearance if carotene could be added to them. Finely divided β-carotene added to such products does not provide a stable dispersion.

In the preferred process of this invention, ether-ethanol solutions of β-carotene are slowly added to hot solutions of soluble starch with rapid stirring; then heating the mixture to higher temperatures of 100°–121° C. The resulting solution stabilizes the carotene and can be diluted many fold without losing stability. If a powdered preparation is desired, it can be obtained by precipitating the starch carotene colloid (or adduct) by addition of ethanol or methanol to a concentration of 50%–70%. The precipitate can be stirred into cooked foods for even distribution of carotene for improving color and nutrition. If pure β-carotene is used, an orange color with an absorption maxima at 520–530 nm. can be obtained. If a yellow color is desired it can be obtained by adding 10–20 times as much vegetable oil as carotene to the ether-ethanol solution. Other solvents such as acetone can be used to dissolve the β-carotene.

Comparison of soluble starch, amylopectin and cornstarch for their ability to bind carotene suggested that amylopectin and cornstarch could bind up to 50 mg. carotene per gram. The soluble starch suspension with 50 mg. carotene/gram had a layer of floating carotene crystals. At 10 mg./g. the soluble starch formed a stable suspension indicating a binding capacity between 10–50 mg./g.

Another method of determining binding capacity was the measure of carotene not precipitated by addition of ethanol (Table 1). All carbohydrates studied appear to be effective in binding carotene at levels up to 10 mg./g. The differences in percent of carotene in the supernatant at 5 mg./g. are judged to have no statistical signnificance since the variation between different attempts was greater than the individual differences reported.

TABLE I.—CAROTENE LEFT IN SUSPENSION AFTER PRECIPITATION OF VARIOUS STARCH CAROTENE SUSPENSIONS

| Carbohydrate at 1 g./100 ml. | Carotene, mg./100 ml. | Amount of carotene in supernatant | Percent carotene in supernatant |
|---|---|---|---|
| Soluble starch | 5 | .034 | .68 |
| Amylopectin | 5 | .080 | 1.60 |
| Cornstarch | 5 | .058 | 1.16 |
| Precipitated soluble starch | 10 | .253 | 2.53 |
| Liquidex | 10 | .230 | 2.30 |
| Soluble sweet potato starch | 10 | .164 | 1.64 |

The soluble sweet potato starch appears to be somewhat more efficient in binding 10 mg. carotene/g. of starch but the practical consequence between 1% or 3% left in the supernatant does not justify statistical analysis.

The various carbohydrates have a wide range of variability in ease of reforming a suspension. The pellet obtained from cornstarch did not completely dissolve after 10 minutes boiling in 100 ml. water. Amylopectin dissolved after 2–3 minutes of boiling, soluble starch, precipitated soluble starch, and liquidex dissolved readily at 80° C. with stirring.

The pellet obtained from soluble starch was very small. A considerably larger pellet was obtained when precipitated soluble starch was used. The liquidex material dried to a very hard hygroscopic glass which was very difficult to handle.

The result of this invention suggests that carbohydrate polymer binding of carotene is a fairly general phenomenon. A wide choice of properties can be obtained by selection of the carbohydrate. The soluble starch isolated from sweet potato appears to be the most similar to the soluble sweet potato starch of the various carbohydrates studied. The color of the suspension can be adjusted. A dark orange color with an absorption maximum around 519 mm. can be obtained by using pure β-carotene. A more yellow color with an absorption maximum near 487 nm. can be obtained by using a total carotene extract or carotene dissolved in a minimal amount of vegetable oil.

The following examples illustrate but do not limit the scope of this invention.

Example 1

Preparation of starch carotene suspensions.—Solutions of cornstarch (A. E. Staley Co.), amylopectin (National Biochemicals Co.) and soluble starch (reagent grade, Fisher Scientific Co.) were prepared by mixing 1.0 g. or 0.1 g. of the starch in 100 ml. boiling water. Recrystallized β-carotene was dissolved in a 1:1 mixture of ether and absolute ethanol to give a solution containing 0.139 mg. β-carotene per ml. solution. The carotene solution was added dropwise to the rapidly stirring boiling starch solutions to give 0.5, 5.0, and 50 mg. β-carotene per gram of starch.

Example 2

Evaluation of starch carotene suspensions.—The above solutions were allowed to cool and were examined visually.

Solutions containing 1 g. starch and 5.0 mg. carotene per 100 ml. were mixed with an equal volume of 95% ethanol and centrifuged at 12,000×g. for 35 minutes. The supernatants were mixed with one fourth volume of ether, then mixed with 2 volumes of water. Carotene which was not precipitated was quantitatively transferred to the ether layer and measured spectrophotometrically (4 times absorbance at 450=mg. carotene per l.).

The pellets were dried under vacuum and tested for their ability to form colored suspensions. The pellets were stirred in boiling water, allowed to cool, then visually examined.

We claim:
1. A process for preparing a water dispersible β-carotene powder which process comprises:
   (a) preparing an ether-ethanol solution of β-carotene by dissolving β-carotene in a 1:1 mixture of ether and absolute ethanol,
   (b) adding the solution from (a) to a rapidly stirred boiling starch solution,
   (c) precipitating the starch carotene colloid by adding methanol or ethanol to the solution from (b) to a concentration of 50–70 percent, and
   (d) mechanically separating the precipitate from (c) to obtain the β-carotene in the form of a powder.

References Cited

UNITED STATES PATENTS 3,110,598  11/1963  Müller _____ 99—148 C

OTHER REFERENCES

Carotinoids and Related Pigments, Palmer, Chem. Cat. Co. Inc., New York, 1922, p. 222.

A. LOUIS MONACELL, Primary Examiner

J. M. HUNTER, Assistant Examiner

U.S. Cl. X.R.

426—177